(No Model.) 4 Sheets—Sheet 1.
J. R. THOMAS.
FEED MECHANISM.
No. 512,410. Patented Jan. 9, 1894.
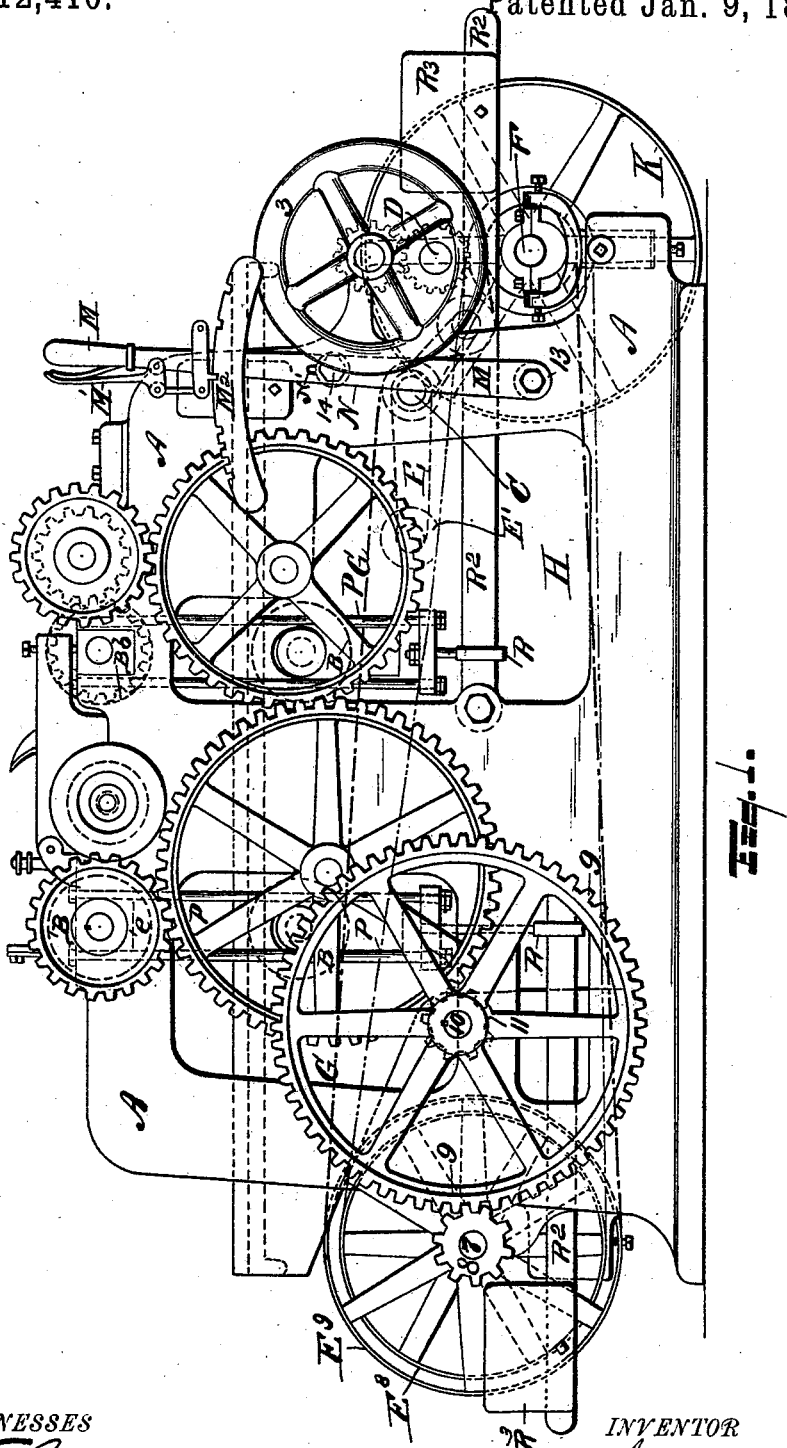
WITNESSES
INVENTOR
John R Thomas (No Model.) 4 Sheets—Sheet 2.
J. R. THOMAS.
FEED MECHANISM.
No. 512,410. Patented Jan. 9, 1894.
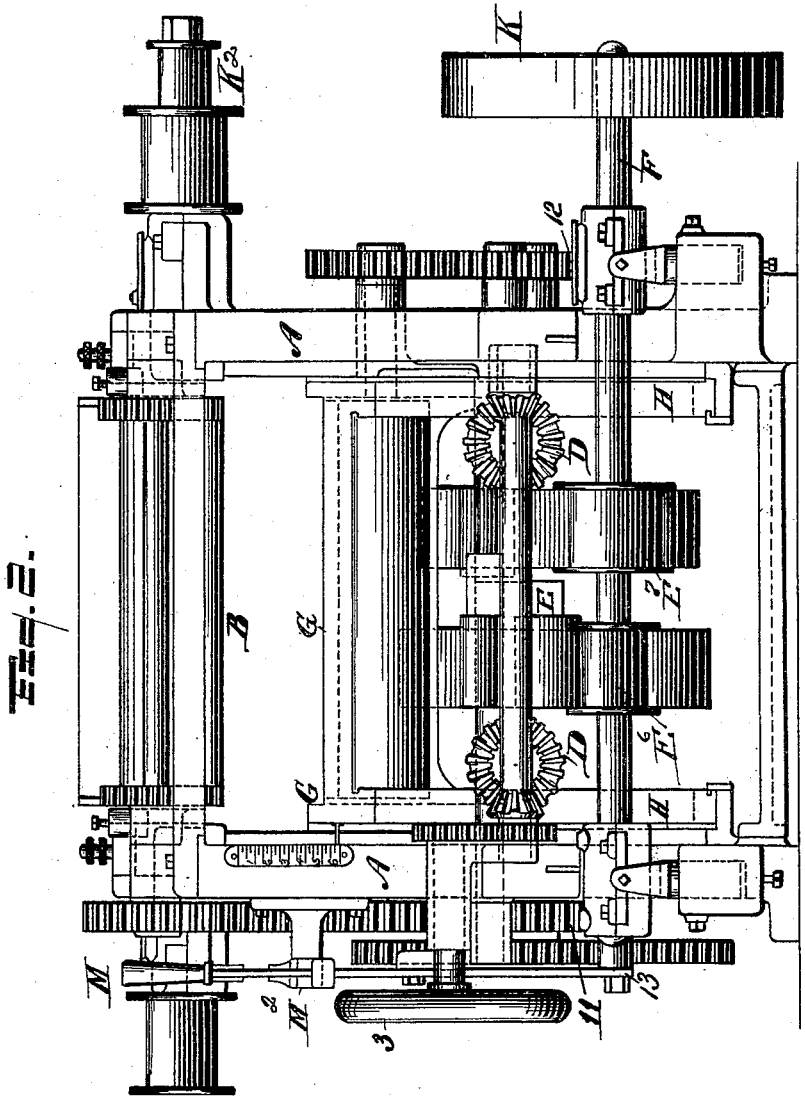
WITNESSES
INVENTOR

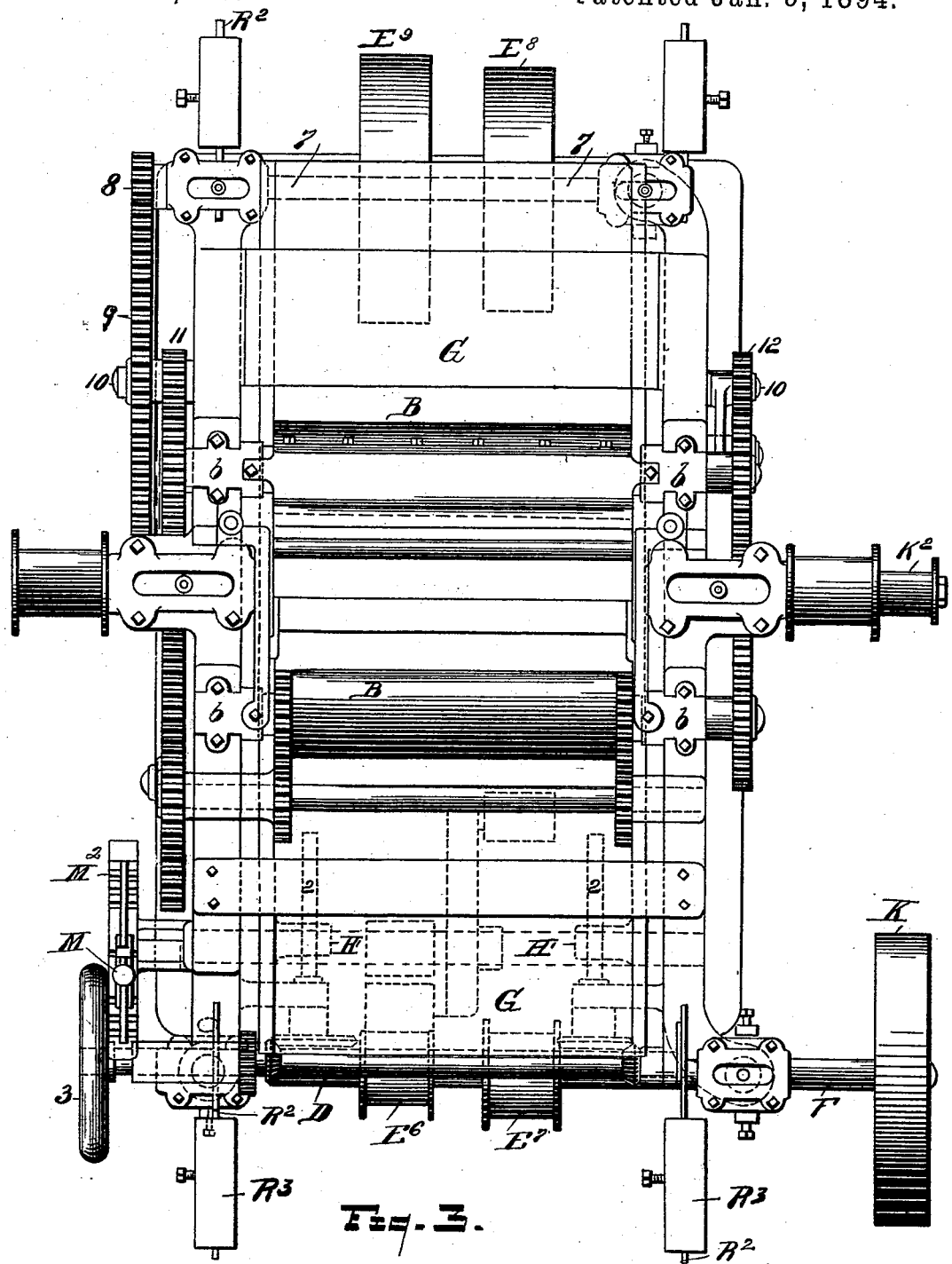

(No Model.) 4 Sheets—Sheet 4.
J. R. THOMAS.
FEED MECHANISM.
No. 512,410. Patented Jan. 9, 1894.
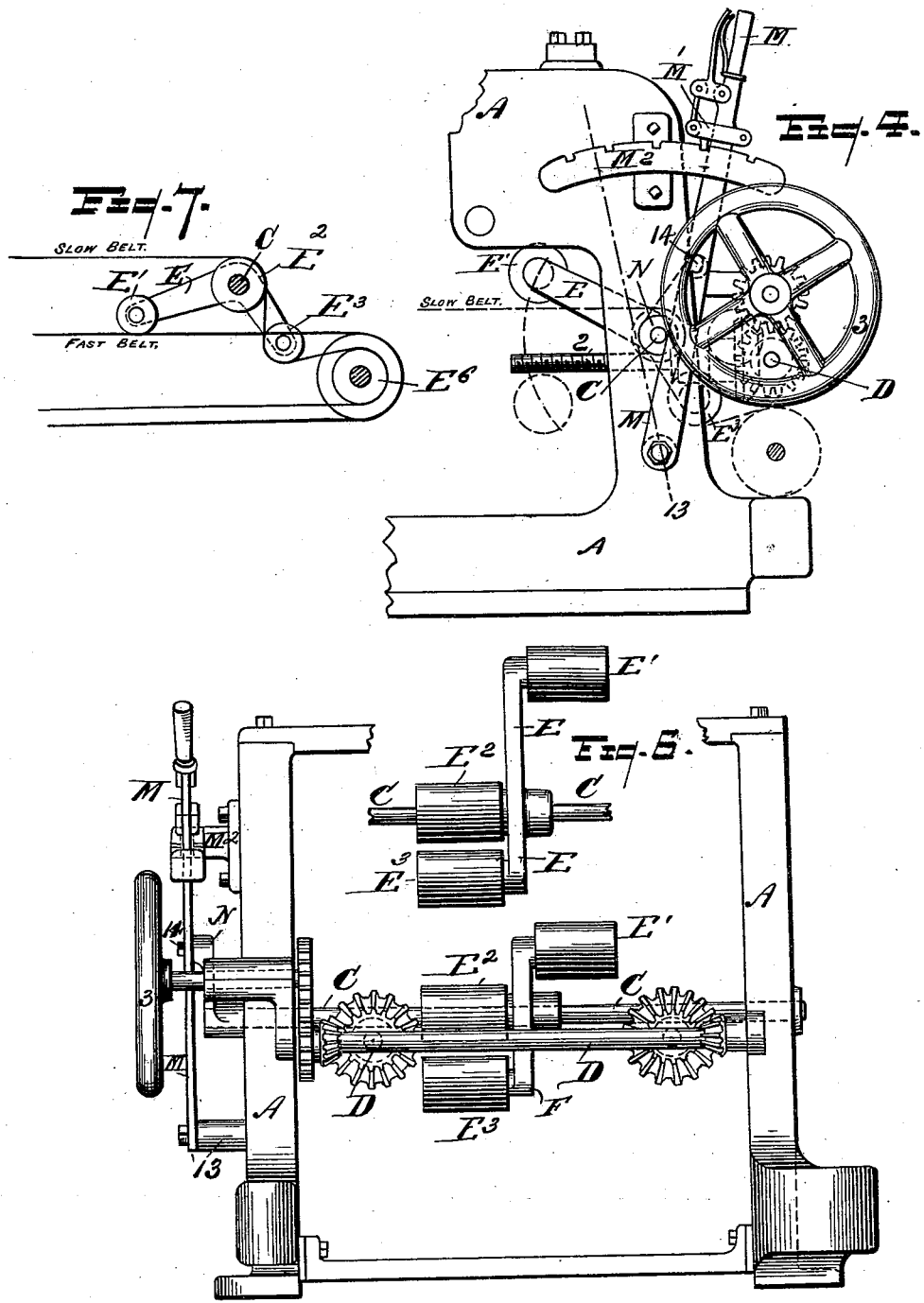

UNITED STATES PATENT OFFICE.

JOHN R. THOMAS, OF BELOIT, WISCONSIN, ASSIGNOR TO THE BERLIN MACHINE WORKS, OF SAME PLACE.

FEED MECHANISM.

SPECIFICATION forming part of Letters Patent No. 512,410, dated January 9, 1894.

Application filed October 11, 1892. Serial No. 448,602. (No model.)

*To all whom it may concern:*

Be it known that I, JOHN R. THOMAS, of Beloit, in the county of Rock and State of Wisconsin, have invented new and useful Improvements in Feed Mechanism for Wood-Planing Machines, of which the following is a specification.

This invention has for its object to provide novel means for stopping or starting the feed mechanism of a planing machine and driving the same either fast or slow.

To accomplish this object my invention consists in the features of construction and the combination or arrangement of devices hereinafter described and claimed, reference being made to the accompanying drawings, in which—

Figure 1 is a side elevation of a wood planing machine embodying my invention. Fig. 2 is an end elevation of the same. Fig. 3 is a plan view of the same. Fig. 4 is a detail side elevation of a portion of the machine. Fig. 5 is a detail end elevation of the same. Fig. 6 is a detail view of the fast and slow tightener pulleys; and Fig. 7 is a detail view, showing the operative relation of the fast and slow belts, and the fast and slow tightener pulleys.

The same letters and numerals are employed in all the figures in the designation of identical parts.

A, is the main frame of the machine adapted for carrying the cutting and feeding mechanism.

B, B, are feeding rollers.

D (Figs. 1, 2 and 5) is a shaft, and gearing thereon, which rotate the screws 2 (see Fig. 3) to raise or lower the table or bed G, which slides on its bottom inclined faces.

C, is a shaft to which are keyed the arms E carrying the belt tightener pulleys E', $E^3$ (see Fig. 5), and on this shaft is a loose idler pulley $E^2$ over which the belt to slow feed pulley $E^6$ is tightened. (See Fig. 7.)

H, H, (Fig. 2) are wedge pieces on each side of the machine, having formed on them screw threaded lugs H', through which the adjusting screws 2 work, being actuated by a hand wheel 3 on the shaft D (see Fig. 3) and cause the wedge pieces H to slide under the correspondingly inclined bottom faces of the table or bed G, thus raising or lowering it at will to adapt it for finishing the wood to the required thickness.

F, is the speed shaft for speed works, and is driven by pulley K connected by belt to pulley $K^2$ on the cutter head spindle. (See Fig. 2.) On this shaft F the feed pulleys $E^6$, $E^7$, of different diameters, are keyed, and are connected by belts to the pulleys $E^8$, $E^9$, also of different diameters, keyed on shaft 7 at the other end of the frame. (See Fig. 3.)

A pinion 8, is keyed to the over-hung end of shaft 7, and meshes into large spur wheel 9 (Fig. 1) keyed to shaft 10, which also carries the pinions 11 and 12 (Fig. 3). The former, 11, is connected by intermediate gearing to the pinions which drive the feed roller B on top of the machine. (See Fig. 3.) The latter, 12, is also connected by suitable expansion gearing and links to gears keyed to feed rollers in the table or bed G.

M, is a lever which controls the feed. Its top is furnished with a handle and spring lock M' which engages notches in the sector piece $M^2$. This lever is fulcrumed on the side frame at 13 and is connected to shaft C, which is oscillated in its bearings by a short lever N. The end of lever N adjacent to lever M, is provided with a pin or bolt 14 fastened into the short lever and projecting laterally through a slot N' in the long lever M, so as to allow for the difference in distance traveled by the two levers when thrown. The short lever moving in the arc of a smaller circle than that of the long lever, throws the tightener pulleys E' $E^3$ through a longer arc than could be done by the long lever were it used alone and confined to the same space to move in as is afforded by the existing arrangement of parts.

As is shown in Figs. 5 and 6, the tightener pulleys E' $E^3$ are placed on opposite sides of the arm E, by which they are operated, and the pulley E' is at a greater distance from the shaft C than is the pulley $E^3$, thus providing for difference in the degree of compression of the pulleys upon their respective belts, the pulley $E^3$ acting on slow belt, and the pulley E' on the fast belt. (See Fig. 7.) It results from this arrangement that when the lever is stopped midway of its arc of movement, both those tightener pulleys are out of engagement with the belts which pass over the pulleys $E^6$ and $E^7$, and in this position the feed mechanism is stopped. But when the lever M is thrown to either end of its arc, one of the tightener pulleys is thrown against the belt on which it is intended to act and puts it in motion by tightening that belt, the other remaining out of contact. If more or less speed is required, by shifting the lever to the other end of its arc, the motion will be accelerated or diminished, as the case may be.

The upper feeding rollers B, B, are carried in bearings $b\ b$, on the top of the frame provided with suitable recesses to receive them.

What I claim as my invention, and desire to secure by Letters Patent, is—

1. The combination with the fast and slow belts of a feed mechanism, of a shaft C, an arm E secured to the shaft, and provided with fast and slow tightener pulleys $E'$, $E^3$ located on opposite sides of said arm for respectively engaging the fast and slow belts, a long lever M, and a short lever N loosely engaging the long lever and secured to said shaft, substantially as described.

2. The combination with the fast and slow belts of a feed mechanism, of a shaft C, an arm E secured to the shaft, and provided with fast and slow tightener pulleys $E'$, $E^3$ at opposite sides thereof for respectively engaging the fast and slow belts, an idler pulley $E^2$ arranged on the shaft, a long lever M, and a short lever N secured to said shaft and engaging the long lever, substantially as described.

3. The combination with the fast and slow belts of a feed mechanism, of a shaft C, an arm E mounted on the shaft, and provided with fast and slow tightener pulleys $E'$, $E^3$ arranged at opposite sides thereof at different distances from the shaft for respectively engaging the fast and slow belts, a pivoted long lever M having a slot $N'$ and a spring catch, and a short lever N secured to the shaft, and provided with a bolt or pin 14 engaging the slot of the long lever, substantially as described.

4. The combination with the fast and slow belts of a feed mechanism, of an oscillating arm E, provided with fast and slow tightener pulleys $E'$, $E^3$ for respectively engaging the fast and slow belts, and lever mechanism for shifting the pulley-carrying arm to either of three positions, substantially as described.

5. The combination with the fast and slow belts of a feed mechanism, of a shaft C, an arm E mounted on the shaft, and provided with fast and slow tightener pulleys $E'$, $E^3$ arranged at opposite sides of said arm at different distances from said shaft for respectively engaging the fast and slow belts, an idler pulley $E^2$ hung on the shaft, and lever mechanism for oscillating the shaft to throw the fast and slow pulleys into or out of engagement with the fast and slow belts, substantially as described.

6. The combination with the fast and slow feed belts of a feed mechanism, of fast and slow tightener pulleys adapted to be alternately moved into engagement with the fast and slow feed belts, and means for moving said pulleys, substantially as described.

In witness whereof I have hereunto subscribed my name in the presence of two attesting witnesses.

JOHN R. THOMAS.

Witnesses:
P. B. YATES.
J. B. DOW.